United States Patent [19]

Adelski et al.

[11] 4,439,704
[45] Mar. 27, 1984

[54] PERMANENT MAGNET EXCITED ROTOR FOR A SYNCHRONOUS MACHINE

[75] Inventors: Hans-Joachim Adelski, Salz; Josef Pflaugner, Wülfershausen, both of Fed. Rep. of Germany

[73] Assignee: Siemens Aktiengesellschaft, Berlin and Munich, Fed. Rep. of Germany

[21] Appl. No.: 213,640

[22] Filed: Dec. 5, 1980

[30] Foreign Application Priority Data

Dec. 12, 1979 [DE] Fed. Rep. of Germany ....... 2950008

[51] Int. Cl.³ .............................................. H02K 3/06
[52] U.S. Cl. ..................................... 310/211; 310/42; 310/183; 29/598
[58] Field of Search ............... 310/179, 162, 163, 216, 310/156, 261, 211, 212, 197, 182, 183, 264, 265, 42; 29/598

[56] References Cited

U.S. PATENT DOCUMENTS

| | | | |
|---|---|---|---|
| 1,508,152 | 9/1924 | Alger | 310/212 |
| 1,752,104 | 3/1930 | Myers | 310/212 |
| 2,543,639 | 2/1951 | Merrill | 310/211 |
| 4,127,786 | 11/1978 | Volkrodt | 310/156 |
| 4,144,469 | 3/1979 | Miyashita | 310/156 |

FOREIGN PATENT DOCUMENTS

| | | | |
|---|---|---|---|
| 2412307 | 9/1975 | Fed. Rep. of Germany | 310/156 |
| 7726439 | 2/1979 | Fed. Rep. of Germany | 310/156 |

*Primary Examiner*—R. Skudy
*Attorney, Agent, or Firm*—Kenyon & Kenyon

[57] ABSTRACT

The invention relates to a permanent magnet-excited rotor for a synchronous machine that has a short circuit cage with shorting rings at both end faces. The lamination stack of the rotor is secured against centrifugal stresses and has slots that extend longitudinally and radially for receiving the permanent magnets. To achieve high strength of the lamination stack against centrifugal stress while preserving the full magnetic strength of the permanent magnets even if the lamination stack is heated to a high temperature in order to case the short circuit cage in place, the slots are closed at the outer circumference of the rotor and recesses large enough to permit the magnets to be inserted into the slots in the axial direction after the cage has been formed are provided in at least one shorting ring.

5 Claims, 3 Drawing Figures

PERMANENT MAGNET EXCITED ROTOR FOR A SYNCHRONOUS MACHINE

BACKGROUND OF THE INVENTION

1. Field of the Invention

This invention relates to a permanent magnet-excited rotor for a synchronous machine which has a short-circuit cage with shorting rings arranged at both end faces and the lamination stack of which, secured against centrifugal stresses, has preferably radial slots for receiving the permanent magnets.

German Pat. No. 24 12 307 shows a rotor having a lamination stack in which individual segments are held by positively engaging undercuts at the shaft. Permanent magnets inserted into the radial slots are magnetized from the outside, after the short-circuit cage has been cast.

German Utility Model No. 77 26 439 suggests closing each of the radial slots at the outer circumference by a narrow strip, which also holds the lamination stack segments together and thereby secures them against centrifugal stresses. Such a securing device is substantially simpler than fastening of the laminated stack segments to the rotor shaft by positive engagement.

If the radial slots are closed at the outer circumference of the rotor, the permanent magnets must be inserted axially into the slots. Inserting the permanent magnets from the shaft opening is impossible as a rule since the radial dimension of the permanent magnets is usually larger than the diameter of the shaft opening. Axial insertion of the permanent magnets, however, must take place before the short circuit cage and the short rings are made, since the slots are covered up by the shorting rings. Permanent magnets which are inserted before the short circuit cage is cast are demagnetized by the high temperature developed during the casting of the cage and must, therefore, be remagnetized from the outside. Such subsequent remagnetizing is not possible with rotors with six or more poles and generally not if rare earth magnets are used.

OBJECTS AND SUMMARY OF THE INVENTION

It is an object of the invention to provide a permanent magnet-excited rotor for a synchronous machine in which high strength of the lamination stack against centrifugal stresses is achieved in a simple manner and in which the full magnetic force of the permanent magnets is preserved if the short circuit cage is cast.

According to the invention, a rotor for a synchronous motor has slots that are closed at the outer circumference of the rotor and one or both shorting rings have recesses that clear the slots in the axial direction to admit elongated magnets into the slots. The individual lamination stack segments are securely held together by closing the slots at the outer circumference and are capable of withstanding large centrifugal forces. Since the radial slots remain axially accessible because of the recesses in the shorting rings, the premagnetized permanent magnets can be axially inserted into the slots after the short circuit cage has been cast. Thus, the full magnetic force of the permanent magnets is preserved.

If the radial dimension of the permanent magnets exceeds the radial width of the shorting rings, the shorting rings are subdivided into segments and each segment extends from one slot to the second-following slot. The segments at one end face are offset circumferentially by a length of arc corresponding to the space between two slots relative to the segments at the other end face so that adjacent slots are accessible from opposite ends of the rotor. This permits virtually the full radial thickness of the lamination stack to be utilized for the arrangement of the permanent magnets.

According to a further embodiment of the invention, a saving of material in the fabrication of a short-circuit cage can be achieved by making the radial dimension of the slots less than the radial thickness of the lamination stack and the radial depth of the recesses equal to the radial dimension of the slots. Each shorting ring has only half as many recesses as the number of the slots and the recesses are arranged in meander-fashion and are offset circumferentially by a length of arc corresponding to the spacing between two slots. The meander shape reduces the volume of the shorting rings and thereby saves material.

Material is also saved and the casting tool is simplified by another embodiment in which the radial dimension of the slots is less than the radial thickness of the lamination stack and the radial depth of the recesses is equal to the radial dimension of the slots. In this embodiment, a number of recesses corresponding to the number of slots is provided in only one shorting ring, and the segment parts of the shorting ring protruding outward between the recesses are connected to a radially inner portion of the shorting ring.

DETAILED DESCRIPTION OF THE INVENTION

Figure 1:
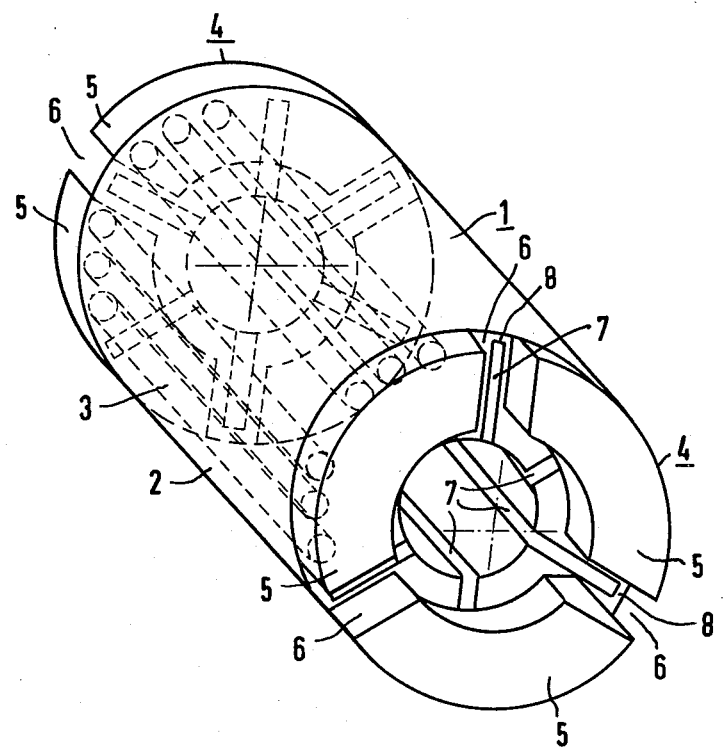
FIG. 1 shows a perspective view of a rotor with shorting rings subdivided into segments.

FIG. 1 shows a laminated rotor that has a lamination stack 2 and a short-circuit cage 3. The shorting rings 4 of the cage 3 are not continuous but are each subdivided into three segments 5 with recesses 6 between the individual segments. A radial slot 7 extends axially the full length of the lamination stack 2 in alignment with each of the recesses 6. At the outer circumference of the rotor 1, the slots 7 are closed by narrow strips 8. These narrow strips 8 may be stamped out in the formation of each lamination, or they can consist of nonmagnetic material which is welded on subsequently. Permanent magnets are inserted into the radial slots 7 and pushed axially through the respective recess 6 into each slot 7.

The arcuate length of the segments 5 of the shorting rings 4 is designed so that these segments extend from one slot past the next following slot to the slot thereafter. In addition, the segments 5 of one shorting ring are offset circumferentially relative to the segments 5 of the other shorting ring 4 by a length of arc corresponding to the arcuate spacing between two slots 7. In this manner a short circuit is obtained over the entire circumference of the rotor 1 even though the segments 5 of the two shorting rings 4 are completely separate from each other. In this embodiment of the rotor, half of the permanent magnets are pushed into the slots 7 from one side and the other half from the other side. This arrangement of the rotor makes it possible to form the slots 7 so that they are closed at the outer circumference of the rotor 1 for reasons of strength fabrication of the short circuit cage by a casting process without having to tolerate losses with respect to the magnetic properties of the permanent magnets.

Figure 2:
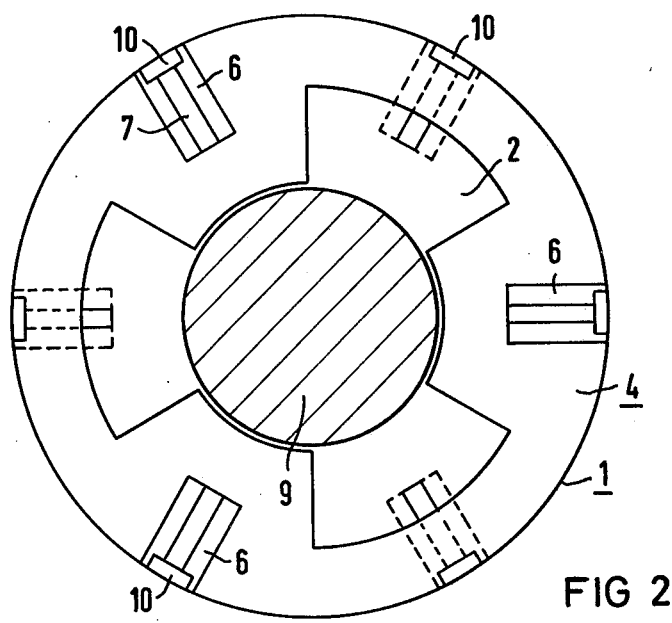
FIG. 2 a front view of a rotor with a meander-shaped shorting ring.

In the rotor shown in FIG. 2, the radial dimension of each of the slots 7 is substantially less than the radial thickness of the lamination stack 2. The radial depth of the recesses 6 corresponds in this embodiment to the radial dimension of the slots 7. The shorting ring 4 at each end of the rotor can therefore bridge across the region between the slots 7 and the shaft 9. Since the number of recesses 6 in each shorting ring 4 is only half as great as the number of slots 7, each shorting ring can be formed in meander-fashion to save material and the two shorting rings can be offset circumferentially by a length of arc corresponding to the spacing between two adjacent slots 7. Half of the permanent magnets can then be pushed through the recesses 6 from one end of the lamination stack 2 and the other half from the other end of the stack. A recess 10 is provided over each of the slots 7 at the other circumference of the rotor 1, and a bar of non-magnetic material is welded into each of these recesses. The bars must be welded in before the magnets are put in place. If the permanent magnets were inserted into the slots 7 first, they would be demagnetized by the heat generated by the arc welding, and the performance of the machine would be impaired thereby. Electron beam welding after the permanent magnets are inserted also would not be possible because the electron beam would be deflected by the magnetic field of the magnets.

Figure 3:
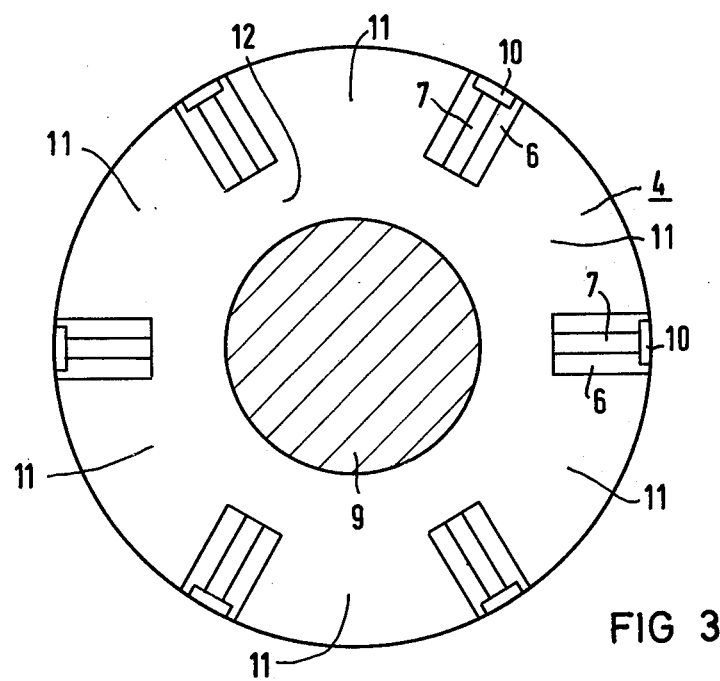
FIG. 3 a front view of a rotor in which a number of recesses corresponding to the number of slots is provided in only one shorting ring.

In a rotor according to FIG. 3, in which the radial dimension of the slots 7 is, as in FIG. 2, substantially less than the radial thickness of the lamination stack 2, the recesses 6, which have a depth matched to the radial dimension of the slots 7, can all be provided in one shorting ring 4. The segment parts 11 of the shorting ring 4 protruding radially outwardly between the recesses 6 are connected here to an inner ring portion 12 surrounding the shaft 9. With such an embodiment of the shorting ring 4, only one of the two shorting rings need be manufactured in this form; the other shorting ring can be manufactured without recesses, as is customary.

What is claimed is:

1. A permanent magnet-excited rotor for a synchronous machine which has a cast short circuit cage comprising shorting rings at both ends, and a cylindrical lamination stack secured against centrifugal stresses and comprising slots that extend generally radially relative to the axis of the stack as well as longitudinally along the stack for receiving permanent magnets, the rotor comprising:

means, rigidly connected to the lamination stack, closing the slots at the outer periphery of the rotor; and recesses in at least one of the rings, the total number of recesses being equal to the number of the slots and each of the recesses being aligned with a corresponding one of the slots and being large enough to allow a magnet to be inserted longitudinally therethrough into the respective one of the slots.

2. The invention in claim 1 in which the lamination stack comprises annular laminations, and the portion of each of the slots in each lamination extends radially only part of the way from the inner radial edge of the lamination toward the outer radial edge, whereby the outer end of each of the slots is closed by an integral part of the lamination.

3. The invention according to claim 1 or 2, in which the radial dimension of each of the slots exceeds the radial width of the shorting rings and the shorting rings are subdivided into segments, each of the segments extends in the arcuate direction from one slot across the following slot to the slot thereafter, and the segments at one end of the rotor are offset angularly relative to the segments at the other end by a length of arc corresponding to the spacing between two of the slots.

4. The invention according to claim 1 in which the slots extend inwardly from the circumference of the rotor, the radial dimension of the slots is less than the radial thickness of the lamination stack, the means closing the slots comprises metal strips attached to the portions of the lamination stack defining the outer end of each of the slots, the radial depth of the recesses is substantially equal to the radial dimension of the slots, each of the two shorting rings has a number of recesses which corresponds to one-half of the number of the slots, and both of the rings are arranged in meander-fashion and are offset angularly relative to each other by a length of arc corresponding to the spacing between two adjacent ones of the slots.

5. The invention according to claim 1 in which the radial dimension of the slots is smaller than the radial thickness of the lamination stack, the radial depth of each of the recesses is substantially equal to the radial dimension of the slots, and all of the recesses are provided in one of the shorting rings and that shorting ring comprises segment parts that protrude outward between the recesses, and are connected by an inner portion of the ring.

* * * * *